US008493323B2

(12) United States Patent
Griffin

(10) Patent No.: US 8,493,323 B2
(45) Date of Patent: Jul. 23, 2013

(54) SYSTEM AND METHOD FOR ADJUSTING PRESENTATION OF MOVING IMAGES ON AN ELECTRONIC DEVICE ACCORDING TO AN ORIENTATION OF THE DEVICE

(75) Inventor: Jason Griffin, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 1157 days.

(21) Appl. No.: 11/832,074

(22) Filed: Aug. 1, 2007

(65) Prior Publication Data

US 2008/0034321 A1 Feb. 7, 2008

Related U.S. Application Data

(63) Continuation-in-part of application No. 11/461,842, filed on Aug. 2, 2006, now Pat. No. 8,139,026.

(51) Int. Cl.
*G06F 3/033* (2006.01)

(52) U.S. Cl.
USPC ............................................ 345/158; 345/619

(58) Field of Classification Search
USPC ........................................ 345/156–158, 619
See application file for complete search history.

(56) References Cited

U.S. PATENT DOCUMENTS

| | | | |
|---|---|---|---|
| 5,864,343 A | 1/1999 | Naughton et al. | |
| 6,229,542 B1 | 5/2001 | Miller | |
| 6,466,198 B1 | 10/2002 | Feinstein | |
| 6,597,817 B1 * | 7/2003 | Silverbrook | 382/289 |
| 6,933,923 B2 | 8/2005 | Feinstein | |
| 7,289,102 B2 * | 10/2007 | Hinckley et al. | 345/156 |
| 2002/0140666 A1 | 10/2002 | Bradski | |
| 2002/0143489 A1 * | 10/2002 | Orchard | 702/141 |
| 2003/0038778 A1 | 2/2003 | Noguera | |
| 2003/0128242 A1 | 7/2003 | Gordon | |
| 2004/0012613 A1 * | 1/2004 | Rast | 345/632 |
| 2004/0015551 A1 * | 1/2004 | Thornton | 709/204 |
| 2004/0105573 A1 * | 6/2004 | Neumann et al. | 382/103 |
| 2004/0107072 A1 * | 6/2004 | Dietrich et al. | 702/153 |

(Continued)

FOREIGN PATENT DOCUMENTS

| | | |
|---|---|---|
| CN | 1714326 A | 12/2005 |
| EP | 0640942 A2 | 3/1995 |

(Continued)

OTHER PUBLICATIONS

Examination Report, Canadian Application No. 2,595,718, mailed Dec. 8, 2010, from Canadian Intellectual Property Office (5 pages).

(Continued)

*Primary Examiner* — Quan-Zhen Wang
*Assistant Examiner* — Calvin C Ma
(74) *Attorney, Agent, or Firm* — Finnegan, Henderson, Farabow, Garrett & Dunner, LLP

(57) ABSTRACT

The invention relates to a system, method and device for changing a notional viewing location for a moving image on a device, depending on an orientation of the device. For the moving image management system, it comprises: a sensor; a movement detection module connected to the sensor providing movement data registering a notable signal from the sensor; and a moving image adjustment module determining a new viewing location of the moving image utilizing the movement data and generating a replacement moving image for the moving image representing the moving image as viewed from the new viewing location.

12 Claims, 14 Drawing Sheets

U.S. PATENT DOCUMENTS

| | | | |
|---|---|---|---|
| 2004/0201595 A1* | 10/2004 | Manchester | 345/649 |
| 2004/0204130 A1* | 10/2004 | Khazaka et al. | 455/566 |
| 2005/0010875 A1 | 1/2005 | Darty | |
| 2005/0030322 A1 | 2/2005 | Gardos | |
| 2005/0185047 A1* | 8/2005 | Hii | 348/36 |
| 2005/0216867 A1 | 9/2005 | Marvit et al. | |
| 2006/0094480 A1 | 5/2006 | Tanaka | |
| 2011/0265046 A1 | 10/2011 | Hinckley | |

FOREIGN PATENT DOCUMENTS

| | | |
|---|---|---|
| EP | 1271288 | 1/2003 |
| EP | 1271288 A2 | 1/2003 |
| JP | 08182022 | 7/1996 |
| JP | 2002/149616 | 5/2002 |
| WO | WO 95/18511 A1 | 7/1995 |
| WO | WO 98/14863 A2 | 4/1998 |
| WO | WO 02/093331 A1 | 11/2002 |
| WO | WO2004/031934 | 4/2004 |
| WO | WO 2005/003986 A1 | 1/2005 |
| WO | WO 2006/036069 A1 | 4/2006 |

OTHER PUBLICATIONS

European Search Opinion, European Application No. 09161857, dated Jul. 1, 2009, from European Patent Office (6 pages).
Examination Report, European Application No. 06118308.3, mailed Apr. 24, 2008, from the European Patent Office (5 pages).
European Search Opinion, European Application No. 06118308.3, mailed Jan. 11, 2007, from the European Patent Office (6 pages).
Examination Report, European Application No. 09162121.9, mailed May 12, 2010, from the European Patent Office (5 pages).
Examination Report, European Application No. 09161857.9, mailed May 12, 2010, from the European Patent Office (5 pages).
Examination Report, European Application No. 09161857.9, mailed Oct. 19, 2009, from the European Patent Office (4 pages).
European Search Opinion, European Application No. 07113647.7, dated Sep. 12, 2007, from European Patent Office (9 pages).
Examination Report, European Application No. 07113647.7, mailed Apr. 24, 2008, from the European Patent Office (6 pages).
Oral Hearing Decision, European Application No. 07113647.7, mailed Jul. 9, 2009, from the European Patent Office (7 pages).
Oral Hearing Decision, European Application No. 06118308.3, mailed Jun. 18, 2009, from the European Patent Office (5 pages).
Office Action from the European Patent Office, dated Sep. 27, 2011, pp. 1-5.
Bane et al., "Interative Tools for Virtual X-Ray Vision in Mobile Augmented Reality," Proceedings of the Third IEEE and ACM International Symposium on Mixed and Augmented Reality, 2004, pp. 1-9.
Office Action, dated Jan. 19, 2012, in corresponding Indian Application No. 1682/CHE/2007 (1 page).
Office Action, dated Mar. 29, 2012, in corresponding Indian Application No. 1682/CHE/2007 (1 page).
Office Action, dated Jan. 16, 2012, in corresponding European Application No. 09162121.9-1527 (7 pages).
Office Action, dated Jan. 16, 2012, in corresponding European Application No. 10179246.3-1527 (4 pages).
European Application No. 09161857.9, Summons to Attend Oral Proceedings Pursuant to Rule 115(1) EPC, mailed Feb. 22, 2011 (6 pages).
Office Action , dated Feb. 22, 2011, for Indian Applicant No. 1682/CHE/2007 filed Jul. 31, 2007 (3 pages).
Examination Report, dated Jul. 7, 2011, from the India Patent Office, in Indian Patent Application No. 1682/CHE/2007.
Search Report, European Application No. 10177727.4, dated Feb. 10, 2011, from the European Patent Office (6 pages).
European Office Action dated Aug. 31, 2012, issued in European Application No. 10179246.3 (6 pages).
U.S. Office Action dated Aug. 28, 2012, issued in U.S. Appl. No. 13/371,421 (13 pages).
Office Action, dated Apr. 16, 2012, in corresponding Canadian Application No. 2,595,718 (2 pages).
Office Action, dated May 10, 2012, in corresponding European Application No. 10 177 727.4-1527 (6 pages).

* cited by examiner

SYSTEM AND METHOD FOR ADJUSTING PRESENTATION OF MOVING IMAGES ON AN ELECTRONIC DEVICE ACCORDING TO AN ORIENTATION OF THE DEVICE

This application is a continuation-in-part application relating to U.S. patent application Ser. No. 11/461,842 filed on Aug. 2, 2006 now U.S. Pat. No. 8,139,026.

The invention described herein relates to a system and method for selectively adjusting presentation of moving images generated on a display of an electronic device. In particular, the invention described herein relates to making adjustments to a viewing position for the moving image according to a movement, change in position or change in orientation of the device.

BACKGROUND OF THE INVENTION

Current wireless handheld mobile communication devices perform a variety of functions to enable mobile users to stay current with information and communications, such as e-mail, corporate data and organizer information while they are away from their desks. Such devices have displays and sophisticated operating systems providing Graphical User Interfaces (GUIs) that impart various static and moving images to the user.

In a handheld device, the desktop metaphor for a GUI is useful, but it has limitations. It can be seen that it is a static, "flat" presentation of moving images and backgrounds. However, when the metaphor is used on handheld devices, there are environment considerations that are not incorporated by the metaphor. For example, as the device is portable, it can be held and used at various orientations (e.g. flat on a desk, canted upright, upside down, etc.) and can be moved in various directions (e.g. up, down, etc.). The static presentation of moving images in a display do not accommodate for such movements.

There is a need for a system and method which addresses deficiencies in the prior art.

BRIEF DESCRIPTION OF THE DRAWINGS

The invention will now be described, by way of example only, with reference to the accompanying drawings, in which.

DETAILED DESCRIPTION OF AN EMBODIMENT

Figure 1:
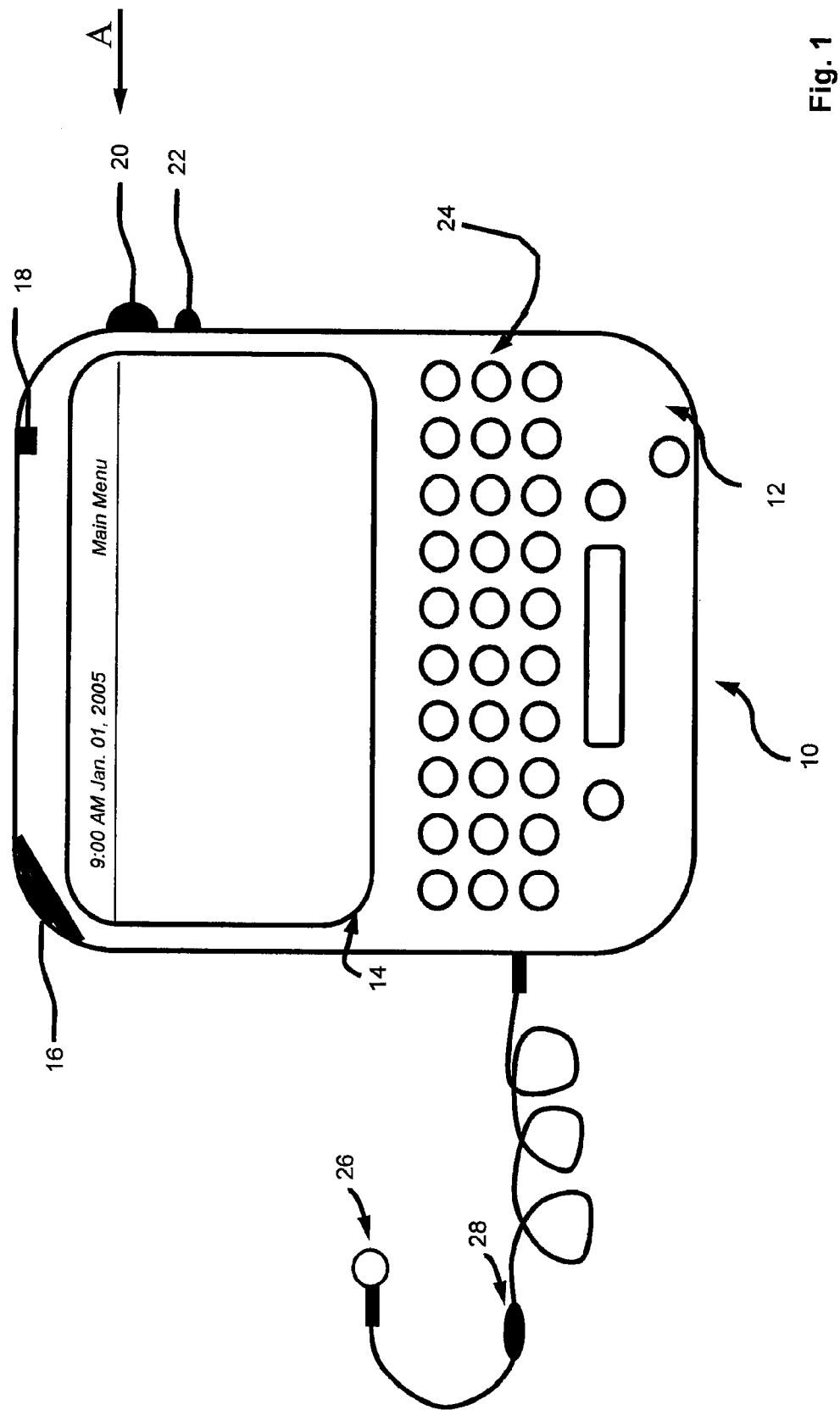
FIG. 1 is a schematic representation of an electronic device having a graphical user interface with a moving image adjustment system and a GUI adjustment system in accordance with an embodiment.

The description which follows and the embodiments described therein are provided by way of illustration of an example or examples of particular embodiments of the principles of the present invention. These examples are provided for the purposes of explanation and not limitation of those principles and of the invention. In the description which follows, like parts are marked throughout the specification and the drawings with the same respective reference numerals.

In a first aspect, a moving image management system for a moving image displayed in a screen on a display of an electronic device is provided. The system comprises: a sensor; a movement detection module connected to the sensor providing movement data registering a notable signal from the sensor; and a moving image adjustment module determining a new viewing location of the moving image utilizing the movement data and generating a replacement moving image for the moving image representing the moving image as viewed from the new viewing location.

The moving image adjustment module may further shift a background image associated with the moving image in the screen reflecting the new viewing location.

In the system, the replacement viewing image may be implemented only if the movement data is within a predetermined shift range.

The sensor may provide positional pitch data about the new movement. Further still, the sensor may provide positional yaw data about the new movement.

In the system, the moving adjustment module may revert the replacement moving image to a default viewing location associated with the moving image after a predetermined amount of time has passed with no notable further movement of the device.

In the system, the moving image adjustment module may access a set of moving images each representing a different viewing location for the moving image when determining the replacement moving image.

In the system, the moving image adjustment module may generate the replacement viewing image using stereoscopic data relating to the set of moving images and the movement data to implement the replacement moving image.

In the system, the moving image adjustment module may generate the replacement moving image utilizing a three dimensional model of elements in the moving image and the movement data.

In the system, the sensor may be an accelerometer.

In a second aspect, a method for adjusting a presentation of a moving image in a screen on a display of an electronic device is provided. The method comprises: monitoring for a notable movement of the device; and when a notable movement has been detected, determining replacement moving image having a new viewing location for the moving image to be displayed on the screen utilizing orientation data relating to the notable movement.

The method may further comprise reverting the new viewing location to a default viewing location for the moving image when a predetermined amount of time has passed with no notable further movement of the device being detected.

In the method, a set of moving images each representing a different viewing location for the moving image may be accessed when determining the replacement moving image.

In the method, the replacement moving image may be generated from stereoscopic data relating to the plurality of moving images and the movement data.

In the method, the replacement moving image may be generated utilizing a three dimensional model of elements in the moving image and the movement data.

In a third aspect, a portable electronic device is provided, comprising: a sensor; a display; software generating an image on the display; a movement detection module connected to the sensor providing an orientation signal registering a notable signal from the sensor; and an image adjustment module providing a replacement image for the image based on a new viewing location determined for the device utilizing orientation data provided by the movement detection module. The image may be a moving image.

In the device, the sensor may be an accelerometer detecting a change in pitch in orientation of the device.

In the device, the moving image adjustment module may shift a background element associated with the image in the screen by a predetermined number of pixels in response to the orientation data.

In other aspects, various combinations of sets and subsets of the above aspects are provided.

Generally, an embodiment provides a system and method of adjusting the a viewing position of a moving image being generated on a screen on a display in an electronic device, based on whether the device is being moved or has been moved. Movement of the device can be determined by a movement detection module. Depending on the determined movement of the device (e.g. being moved upright, horizontal, tilted forward, etc.) the viewing position of the moving image can be adjusted to mimic or reflect the movement. This can be achieved by generating a replacement moving image to reflect the changed viewing position.

Exemplary details of aspect of embodiments are provided herein. First, a description is provided on general concepts and features of an embodiment. Then, further detail is provided on control features relating to adjusting static images in a GUI. Then, further detail is provided on control features relating to the moving image adjustment module.

FIG. 1 provides general features of an electronic device for receiving electronic communications in accordance with an embodiment of the invention, which is indicated generally at 10. In the present embodiment, electronic device 10 is based on a computing platform having functionality of an enhanced personal digital assistant with cellphone and e-mail features. It is, however, to be understood that electronic device 10 can be based on construction design and functionality of other electronic devices, such as smart telephones, desktop computers pagers or laptops having telephony equipment. In a present embodiment, electronic device 10 includes a housing 12, an LCD 14, speaker 16, an LED indicator 18, a trackwheel 20, an ESC ("escape") key 22, keypad 24, a telephone headset comprised of an ear bud 26 and a microphone 28. Trackwheel 20 and ESC key 22 can be inwardly depressed along the path of arrow "A" as a means to provide additional input to device 10.

It will be understood that housing 12 can be made from any suitable material as will occur to those of skill in the art and may be suitably formed to house and hold all components of device 10.

Device 10 is operable to conduct wireless telephone calls, using any known wireless phone system such as a Global System for Mobile Communications (GSM) system, Code Division Multiple Access (CDMA) system, CDMA 2000 system, Cellular Digital Packet Data (CDPD) system and Time Division Multiple Access (TDMA) system. Other wireless phone systems can include Wireless WAN (IMS), Wireless MAN (Wi-max or IEEE 802.16), Wireless LAN (IEEE 802.11), Wireless PAN (IEEE 802.15 and Bluetooth), etc. and any others that support voice. Additionally, a Bluetooth network may be supported. Other embodiments include Voice over IP (VoIP) type streaming data communications that can simulate circuit-switched phone calls. Ear bud 26 can be used to listen to phone calls and other sound messages and microphone 28 can be used to speak into and input sound messages to device 10.

Figure 2:
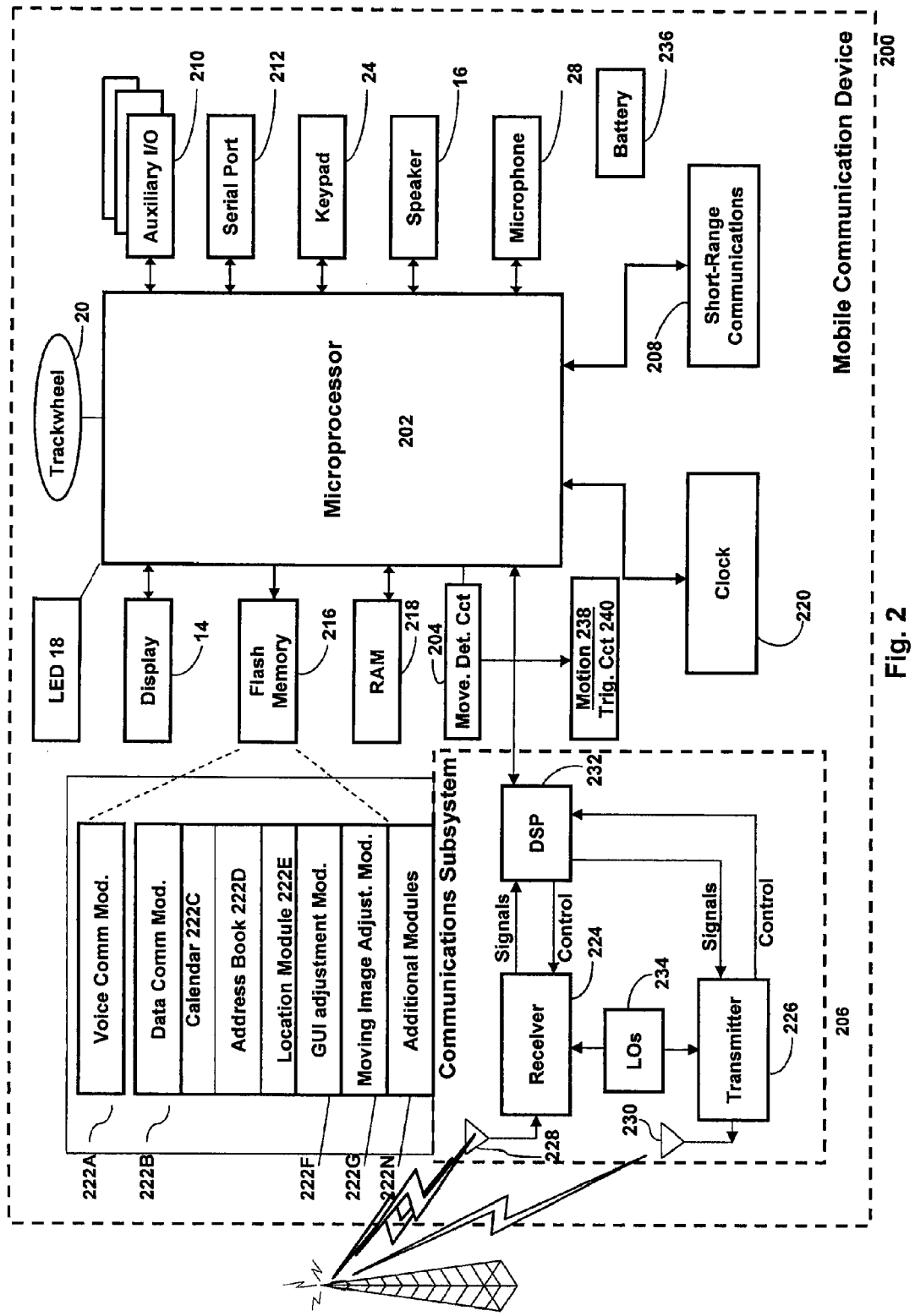
FIG. 2 is a block diagram of certain internal components and the GUI adjustment system in the device in FIG. 1.

Referring to FIG. 2, functional components of device 10 are provided in schematic 200. The functional components are generally electronic, structural or electro-mechanical devices. In particular, microprocessor 202 is provided to control and receive almost all data, transmissions, inputs and outputs related to device 10. Microprocessor 202 is shown schematically as coupled to keypad 24 and other internal devices. Microprocessor 202 preferably controls the overall operation of the device 10 and its components. Exemplary microprocessors for microprocessor 202 include microprocessors in the Data 950 (trade-mark) series, the 6200 series and the PXA900 series, all available at one time from Intel Corporation. Microprocessor 202 is connected to other elements in device 10 through a series of electrical connections to its various input and output pins. Microprocessor 202 has an IRQ input line which allows it to receive signals from various devices. Appropriate interrupt firmware is provided which receives and reacts to the signals detected on the IRQ line. Movement detection module 204 provides analysis of input signals to determine the whether device 10 has been moved or whether its orientation has changed.

In addition to microprocessor 202, other internal devices of the device 10 are shown schematically in FIG. 2. These include: display 14; speaker 16; keypad 24; communication sub-system 206; short-range communication sub-system 208; auxiliary I/O devices 210; serial port 212; microphone 28; flash memory 216 (which provides persistent storage of data); random access memory (RAM) 218; internal clock 220 to track and synchronize applications and other device subsystems (not shown). Device 10 is preferably a two-way radio frequency (RF) communication device having voice and data communication capabilities. In addition, device 10 preferably has the capability to communicate with other computer systems via the Internet.

Operating system software executed by the microprocessor 202 is preferably stored in a computer readable medium, such as flash memory 216, but may be stored in other types of memory devices, such as read only memory (ROM) or similar storage element. In addition, system software, specific device applications, or parts thereof, may be temporarily loaded into a volatile store, such as RAM 218. Communication signals received by the mobile device may also be stored to RAM 218.

Microprocessor 202, in addition to its operating system functions, enables execution of software applications on device 10. A set of software (or firmware) applications, referred to generally as applications 222, that control basic device operations, such as voice communication module 222A and data communication module 222B, may be installed on the device 10 during manufacture or downloaded thereafter. As well, additional software modules, which may be for instance a personal information manager (PIM) application, may be installed during manufacture or downloaded thereafter into device 10. Data associated with each application can be stored in flash memory 216.

GUI adjustment module 222F provides control and adjustment of icons, text and background images produced on display 14 by an application 222, utilizing movement information provided by movement detection module 204. Data relating to the current view, location and orientation and other placement data for elements displayed on a GUI (e.g. icons, text, graphics and dialog boxes) may be stored in memory 216 or 218. The data can be accessed and modified by module 222F.

Moving image adjustment module 222G provides control and adjustment of moving images produced on display 14 by an application 222, utilizing movement information provided by movement detection module 204. Data relating to the current view, location and orientation and other placement data for a new point of view for the moving image displayed. The data can be accessed and modified by module 222G. It will be appreciated that module 222G may process images as well.

Communication functions, including data and voice communications, are performed through the communication sub-system 206 and the short-range communication sub-system 208. Collectively, sub-systems 206 and 208 provide the signal-level interface for all communication technologies processed by device 10. Various applications 222 provide the operational controls to further process and log the communications. Communication sub-system 206 includes receiver 224, transmitter 226 and one or more antennas, illustrated as receive antenna 228 and transmit antenna 230. In addition, communication sub-system 206 also includes processing module, such as digital signal processor (DSP) 232 and local oscillators (LOs) 234. The specific design and implementation of communication sub-system 206 is dependent upon the communication network in which device 10 is intended to operate. For example, communication sub-system 206 of device 10 may operate with the Mobitex®, DataTAC® or General Packet Radio Service (GPRS) mobile data communication networks and also operate with any of a variety of voice communication networks, such as Advanced Mobile Phone Service (AMPS), Time Division Multiple Access (TDMA), Code Division Multiple Access CDMA, Personal Communication Service (PCS), Global System for Mobile Communication (GSM), etc. Other types of data and voice (telephonic) networks, both separate and integrated, may also be utilized with device 10. In any event, communication sub-system 206 provides device 10 with the capability of communicating with other devices using various communication technologies, including instant messaging (IM) systems, text messaging (TM) systems and short message service (SMS) systems.

In addition to processing communication signals, DSP 232 provides control of receiver 224 and transmitter 226. For example, gains applied to communication signals in receiver 224 and transmitter 226 may be adaptively controlled through automatic gain control algorithms implemented in DSP 232.

In a data communication mode, a received signal, such as a text message or web page download, is processed by the communication sub-system 206 and is provided as an input to microprocessor 202. The received signal is then further processed by microprocessor 202 which can then generate an output to display 14 or to an auxiliary I/O device 210. A device user may also compose data items, such as e-mail messages, using keypad 24, trackwheel 20 and/or some other auxiliary I/O device 210, such as a touchpad, a rocker switch, a separate thumbwheel or some other input device. The composed data items may then be transmitted over communication network 140 via communication sub-system 206. Sub-system 206 may also detect when it is out of communication range for its remote systems.

In a voice communication mode, overall operation of device 10 is substantially similar to the data communication mode, except that received signals are output to speaker 16, and signals for transmission are generated by microphone 28. Alternative voice or audio I/O sub-systems, such as a voice message recording sub-system, may also be implemented on device 10. In addition, display 14 may also be utilized in voice communication mode, for example, to display the identity of a calling party, the duration of a voice call, or other voice call related information.

Short-range communication sub-system 208 enables communication between device 10 and other proximate systems or devices, which need not necessarily be similar devices. For example, the short-range communication sub-system may include an infrared device and associated circuits and components, or a Bluetooth (trade-mark) communication module to provide for communication with similarly-enabled systems and devices.

Powering the entire electronics of the mobile handheld communication device is power source 236. Preferably, the power source 236 includes one or more batteries. More preferably, the power source 236 is a single battery pack, especially a rechargeable battery pack. A power switch (not shown) provides an "on/off" switch for device 10. Upon activation of the power switch an application 222 is initiated to turn on device 10. Upon deactivation of the power switch, an application 222 is initiated to turn off device 10. Power to device 10 may also be controlled by other devices and by software applications 222.

Figure 3:
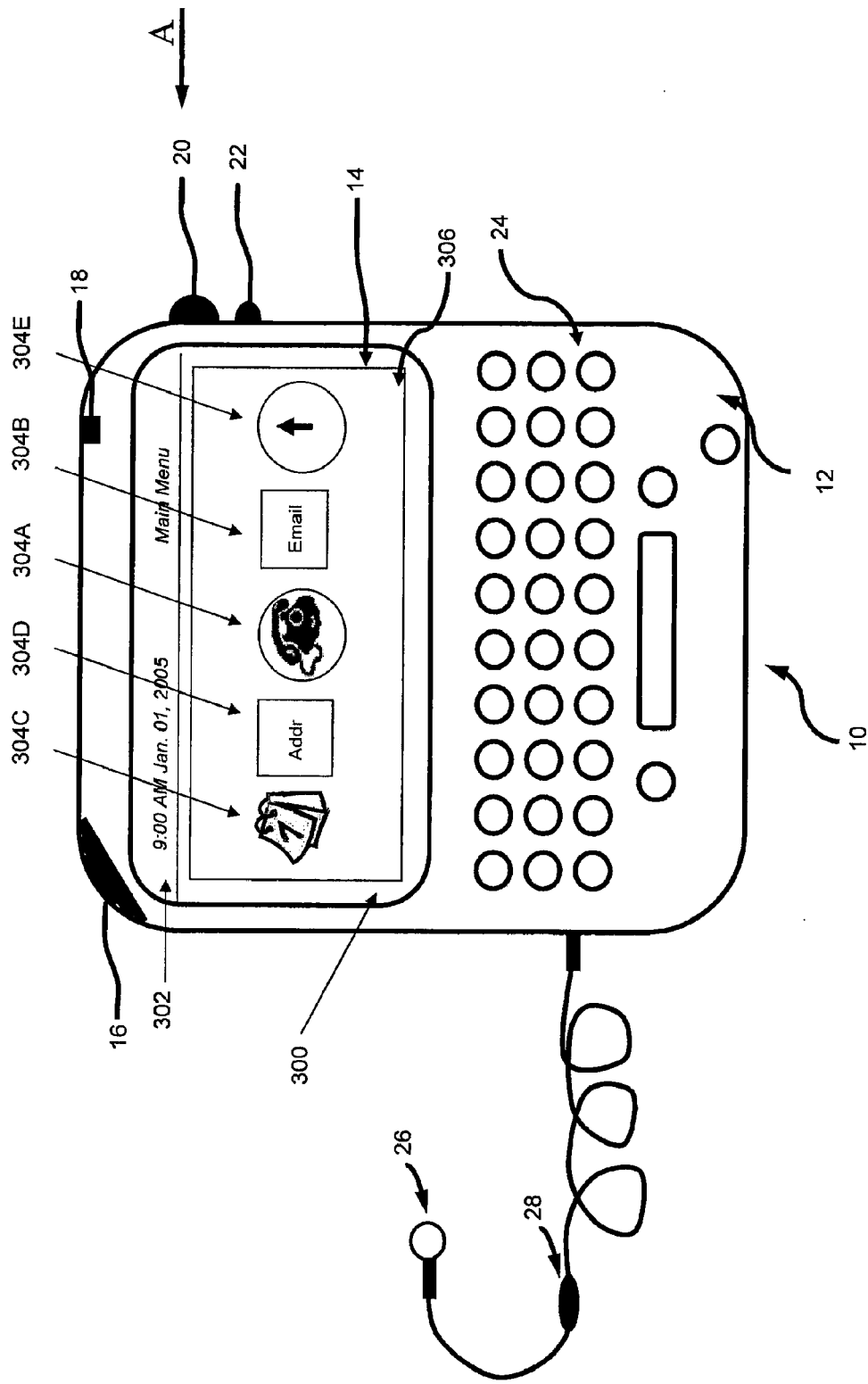
FIG. 3 is a schematic representation of the device of FIG. 1 with its display showing a plurality of applications including an address book, a calendar, an e-mail message module, a cellphone module and a GPS module according to an embodiment.

Referring now to FIG. 3, device 10 is shown in operation where applications 222 stored therein are being executed. A screen image is generated on the display showing operational aspects of device 10 and is comprised of several elements, including icons, text, background images, dialog boxes, pop-up windows, etc. In screen 300, for example, applications generate and control aspects of screen image 300. Therein, time and date region 302 is displayed providing time and date information which is updated according to internal clock 220. Screen image 300 has several applications presented thereon through separate icons 304, which individually represent separate applications 222. An icon is used to represent an application, file, folder or object stored or processed by the device. For the purposes of the description of an embodiment herein, the term "icon" refers to any of: graphics alone, text alone, or a combination of graphics and text, which represents an associated application, file, folder, etc., and the term "object" refers to any file, application, folder, dataset or information stored on device 10 which has an "icon" associated with it. A screen image may also have a dialog box provided therein. Typically, a dialog box provides a contained GUI "window" allowing the user to provide some type of input or selection or it may be a "pop-up" window provide information to the user. Background pattern 306 is provided, such that the icons 304 are generated "on top" of background pattern 306. Here, pattern 306 is shown as being blank, and for illustrative purposes, pattern 306 is shown as a panel having a recognizable border. It will be appreciated that pattern 306 may be any picture, text, icon or other graphical image.

Using either specific keystrokes on keypad 24 or trackwheel 20, the icons can be sequentially highlighted and selected. In particular, to select and activate a particular application, once the icon is highlighted, it can be selected by clicking trackwheel 20 inwardly along the path of arrow A. ESC key 22 can be used to exit any application by pressing inwardly, along the path of arrow A, on ESC key 22. Generally, when no selected application is running in the "foreground" of device 10, (i.e. actively operating and generating its GUIs on the display after being explicitly activated by either the user or an internal command within device 10), then screen image 300 is generated on display 14. A brief description of functional aspects of selected applications is provided.

Telephone application 222A (which is associated with icon 304A) provides an interface to allow the user of device 10 to initiate a telephone call on device 10. It also provides a GUI to store and list a record of telephone calls made, telephone calls received and voice-mail messages stored by device 10.

Email application 222B (which is associated with icon 304B) provides modules to allow user of device 10 to generate email messages on device 10 and send them to their addressees. Application 222B also provides a GUI which provides a historical list of emails received, drafted, saved and sent.

Calendar 222C (which is associated with icon 304C) tracks appointments and other status matters relating to the user and device 10. It provides a daily/weekly/month electronic schedule of appointments, meetings and events as entered by the user. Calendar 222C tracks time and day data for device 10 using processor 202 and internal clock 220. The schedule contains data relating to the current availability of the user. For example it can indicate when the user is busy, not busy, available or not available. The application can also provide a "do not disturb" window of time for a user. Effectively, calendar 222C allows device 10 to be set to not notify the user when an interrupt event occurs, in spite of any lack of scheduled appointments during that window.

Address book 222D (which is associated with icon 304D) enables device 10 to store contact information for persons and organizations. In particular, name, address, telephone numbers, e-mail addresses, cellphone numbers and other contact information are stored in linked records. The data is stored in non-volatile memory, such as memory 216 in device 10 in a database. In use, the database is organized such that individual contact information can be accessed and cross referenced to other data in the same or other applications.

Location module 222E (which is associated with icon 304E) provides the current geographic location of device 10. In one embodiment, it receives and interprets remote GPS signals from a system of satellites to triangulate the current location of device 10, using, for example GPS modules and applications known in the art. On device 10, a GPS interface application controls the storage of GPS data retrieved by location module 222E. Alternatively, location information may be determined by analyzing encoded data relating to cellular telephone calls executed on device 10. For example, the encoded data stream can be examined to identify the current base station to which device 10 is communicating.

Further detail is now provided on an embodiment where a layout of a GUI is adjusted in reaction to a movement of device 10.

Figure 4:
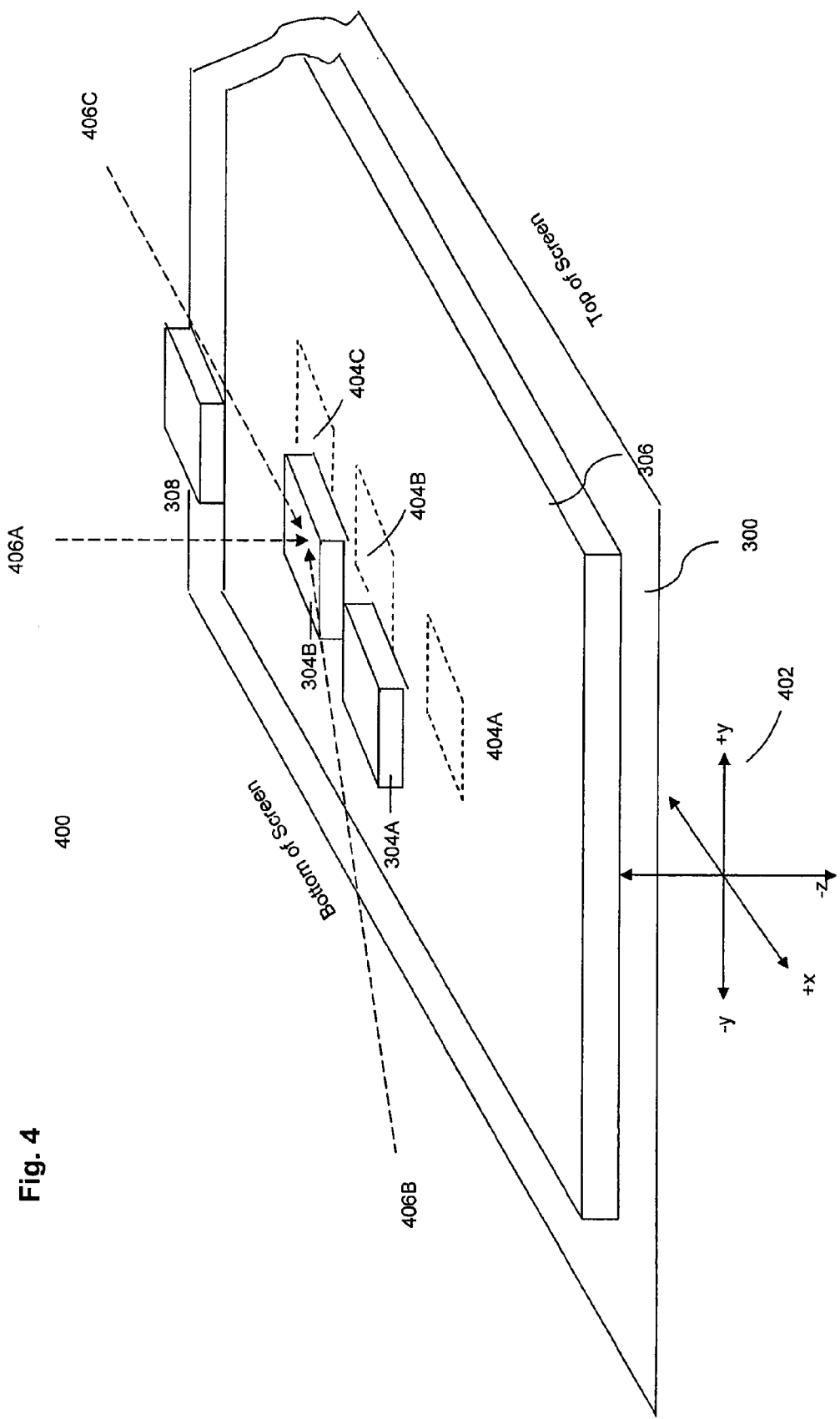
FIG. 4 is a schematic diagram of three exemplary visual perspectives of a user viewing elements of a screen image generated on a display of the device of FIG. 1, generated, in part, by the GUI adjustment system of an embodiment.

As an exemplary location modelling paradigm for elements in a GUI used by an embodiment, FIG. 4 shows view 400 illustrating a spatial representation of elements shown in a particular screen image 300, comprising background 306, icons 304A-B and dialog box 308. All elements are represented as three dimensional tiles for the sake of illustration. In order to assist in distinguishing icons 304 from background 306, elements are notionally positioned relative to each other using x, y, and z co-ordinates. Orientation rose 402 provides a Cartesian reference for the x, y and z directions. View 400 places background 306 at one z level, icons 304A and 304B at a higher z level and dialog box 308 at a yet higher z level. Shadows 404A, 404B and 404C show notional x-y position of icons 304A-304B and dialog box 308 on background 306 to aid in identifying their positions on background 306. Shadows 404 are generally not generated as part of the GUI; however, they may be generated in other embodiments. Specific values for the levels may or may not be provided in a particular modelling paradigm.

For this modelling paradigm, one level of elements is defined to be the base level. As such, other elements at other levels are either "above" or "below" the base level. The layers are also figuratively mapped to the images on screen 300. Some layers are above other layers. The base layer is effectively associated with the plane of the screen. Elements in layers below the base layer are "below" the screen. Elements in layers above the base layer are "above" the screen. Elements on the plane of the screen (i.e. elements in the base layer) do not move, when the paradigm is adjusting elements to mimic a detected movement of device 10. Instead elements in other layers are moved.

Using the three dimensional paradigm as illustrated it will be apparent that when a user views screen image 300 from different positions, slight changes in positioning of icons 304 relative to background 306 will be seen. For example, if a user is at a position which looks straight down on screen image 300, this can be notionally mapped at position 406A, with position x=0, y=0, z=a given height. Position 406A is an exemplary notional viewing position that would be provided by a "desktop" view of GUIs that is provided in current GUI-based operating systems, such as Windows (trademark). Next, if a user is at a position which is down and to the right of the straight down view (in terms of x and y directions), for example position 406B, and is viewing screen image 300 at a lower height than the straight down view, it would appear at the viewer that background 306 has shifted slightly closer towards the user. Position 406B can be notionally mapped at x=a positive value, y=a negative value, z=a negative value (each value being a change from the x, y, z values for position 406A). Next, if a user is at a position which is up and to the left of the straight down view (in terms of x and y directions), for example position 406C, and is viewing screen image 300 at a higher height than the straight down view, it would appear at the viewer that background 306 has shifted further away from the user. Position 406C can be notionally mapped at x=a negative value, y=a positive value, z=a positive value (each value being a change from the x, y, z values for position 406A).

As such, the modelling paradigm may be used to adjust the elements displayed on a screen as follows. First, it is presumed that device 10 is situated at a steady state orientation or position. For example, device 10 may be lying flat on a table or may be held steadily by a user at a fairly static position. In the steady state position, the paradigm places the notional viewer at position 406A. When device 10 is moved, preferably the elements that are not in the base layer are moved to reflect or mimic the movement of device 10. For example, device 10 can be moved from position 406A to 406B. As noted, it will be seen that certain elements "shift" away from each other as the viewing position moves from 406A to 406B. The embodiment mimics this movement by shifting one or more elements in screen image 300 that are not in the base layer, such as by shifting background 306 and dialog box 308.

In order to provide a default viewing arrangement for screen 300, after the elements are shifted in screen image 300 and after a preset amount of time has passed, the elements are realigned to their original default locations in screen image 300, providing a quasi-"gravity" effect for the elements. The return shift may be gradual, wherein the elements are redrawn in intermediate locations as the elements "creep" back to their default positions.

Figure 5A:
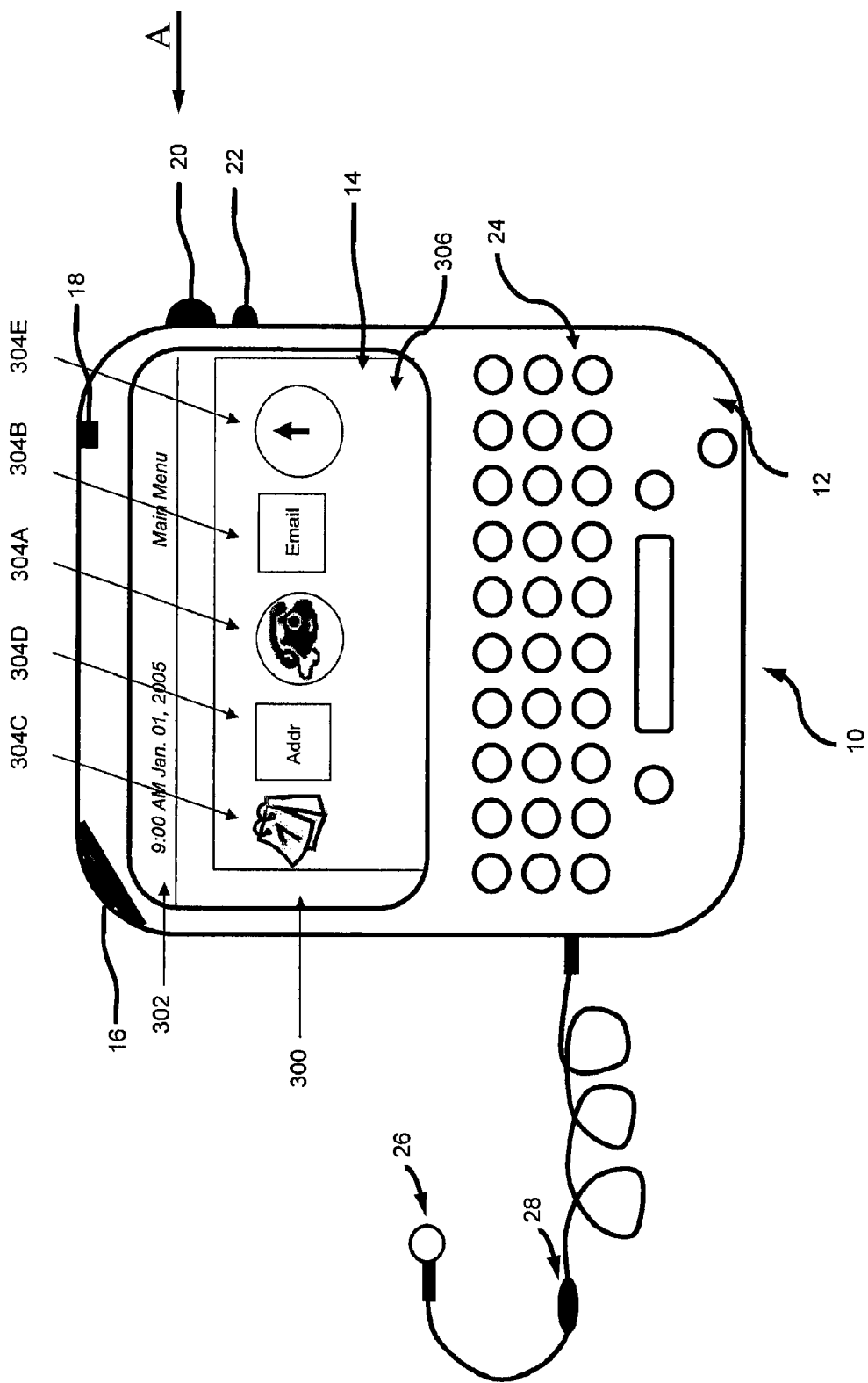
FIG. 5A is a schematic representation of the device of FIG. 1 showing on its display one arrangement of icons produced during execution of the GUI adjustment system of an embodiment.
Figure 5B:
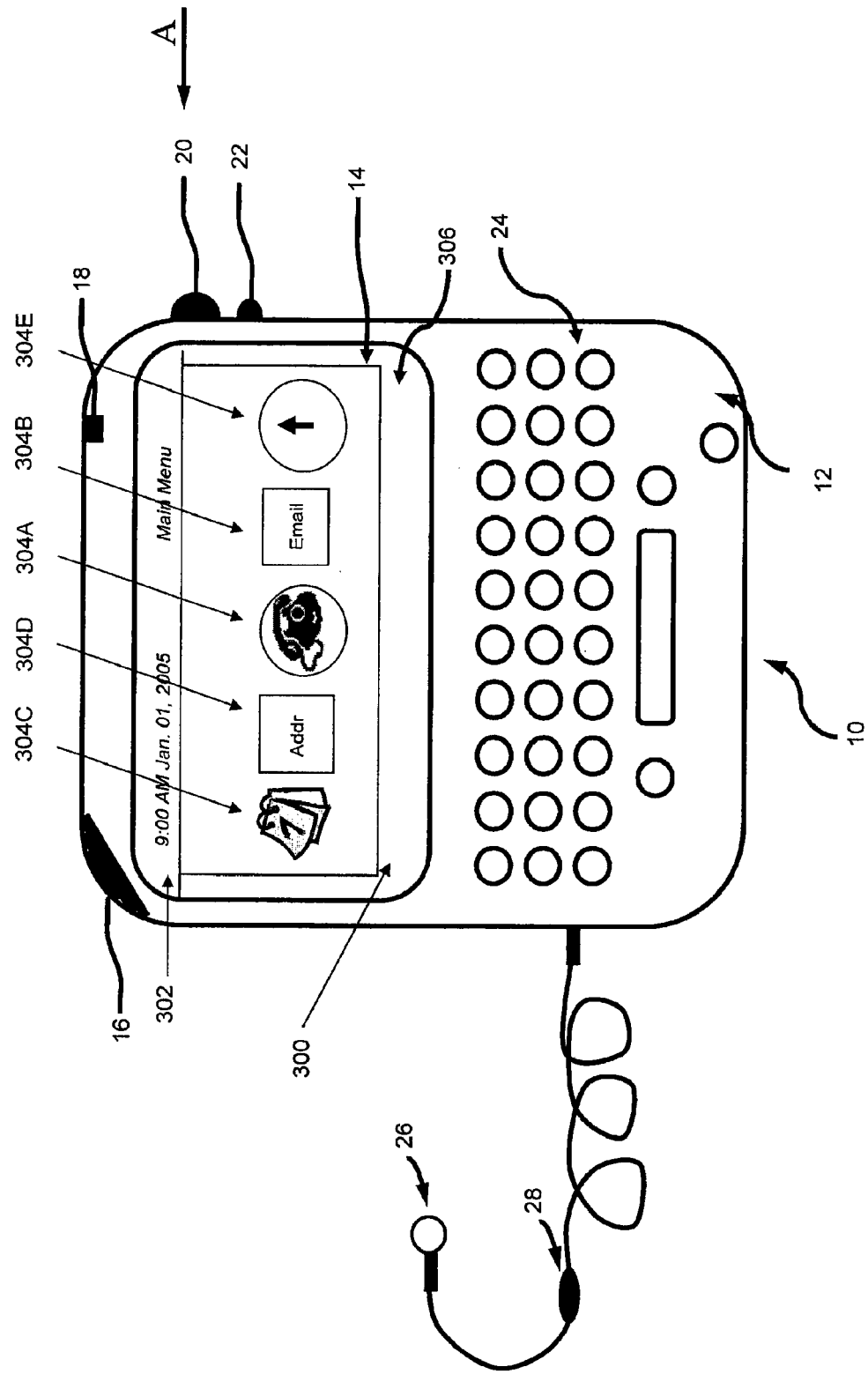
FIG. 5B is a schematic representation of the device of FIG. 1 showing on its display another arrangement of icons produced during execution of the GUI adjustment system of an embodiment.
Figure 5C:
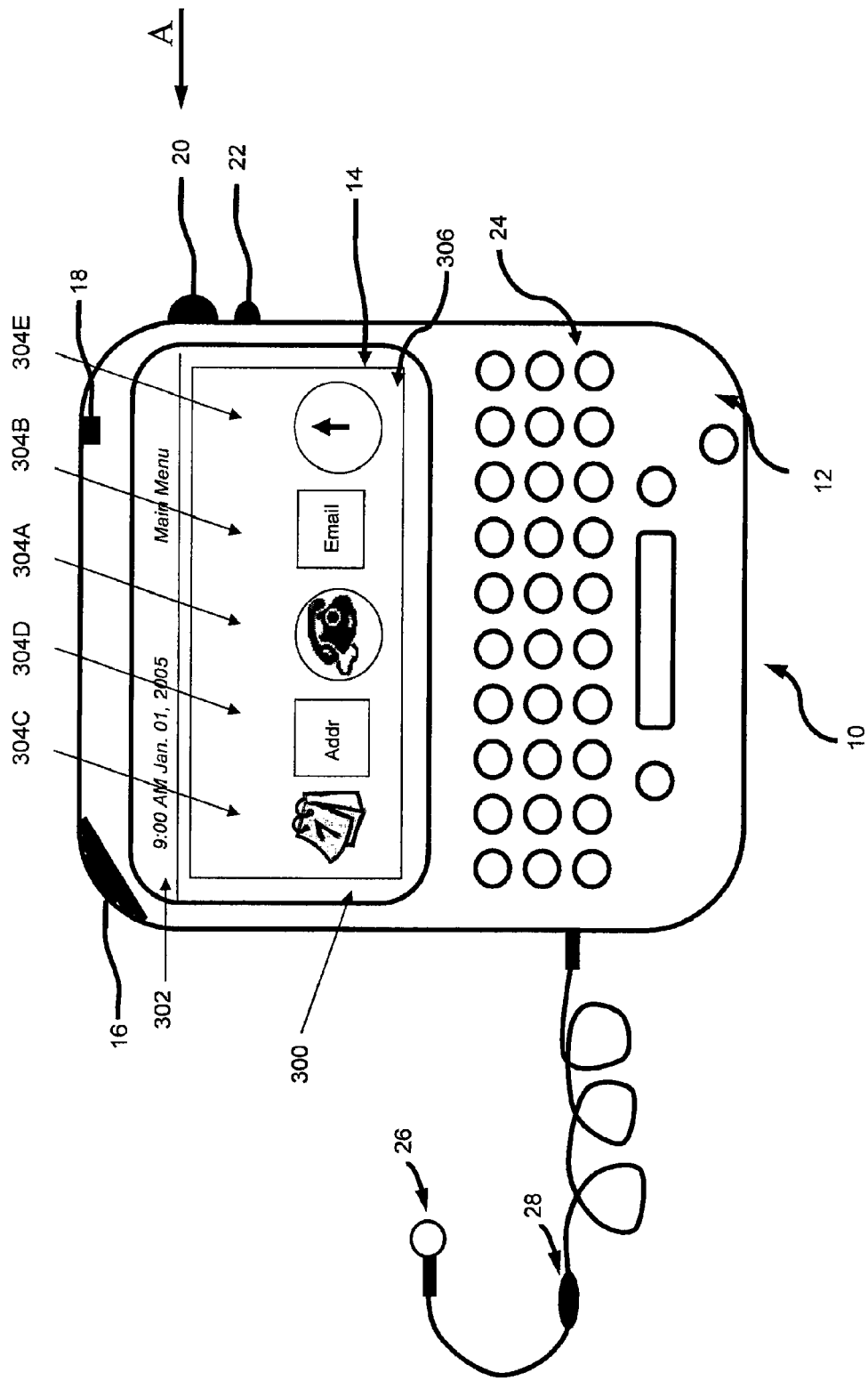
FIG. 5C is a schematic representation of the device of FIG. 1 showing on its display yet another arrangement of icons produced during execution of the GUI adjustment system of an embodiment.

FIGS. 5A, 5B and 5C show exemplary adjustments made to GUIs that are adjusted to reflect the movement of device 10. In FIG. 5A, background 306 is shifted down and to the left from its original position in FIG. 3 while the icons 306 remain at their earlier locations, representing an view for position 406C (FIG. 4). In FIG. 5B, background 306 is shifted up and to the right from its original position in FIG. 3, representing a view for position 406B (FIG. 4). Referring to FIG. 5C, as an alternative to shifting background 306, an embodiment may also shift icons 306, where icons 304 are moved and background 306 is not. Therein, icons 306 are moved lower in display 14, representing a view for position 406B (FIG. 4).

In another paradigm, the viewing position of a user can be estimated, derived or simulated from the orientation of device 10. If device 10 is lying flat (e.g. on a table), it can be presumed that the viewer is notionally at position 406A. If device 10 is being held generally upright, with the top of device 10 canted away from the viewer, it can be presumed that the viewer is notionally at a position where the y coordinate is negative, such as at position 406B. If device 10 is being held with the left side of device 10 canted towards the viewer, it can be presumed that the viewer is notionally at a position where the x coordinate is negative, such as position 406C. It will be appreciated that there is a mapping of the determined movement of device 10 to a viewing position of elements on screen image 300.

In order to translate map a determined movement of device 10 to a particular viewing position, an embodiment can alter the arrangement of elements in a particular screen, such as screen image 300. A given arrangement may (preferably slightly) move icons/text 304 and/or background images 306 and/or dialog boxes to provide effect of the perspective view of the screen provided at the given viewing position. Additionally or alternatively, elements in the base layer (e.g. icons 304) can be represented as three-dimensional elements and their depths can be shown from different perspectives, relative to the movement of device 10.

In yet another paradigm, when a movement of device 10 is detected, elements in the base layer on screen image 300 remain where they were before the movement, but the other elements are shifted in the opposite direction of the movement and then they are gradually shifted back to their original positions. This provides a "trailing" effect for the display. It will be appreciated that other paradigms may be provided for mimicking, simulating or enhancing the display of elements on a GUI taking into consideration a detected movement or orientation change of device 10.

GUI adjustment module 222F obtains movement data provided from movement module 204 and utilizes that data and data relating to the current position of elements in screen image 300 to determine whether and what adjustments should be provided to screen image 300 to reflect the current movement of device 10. For the embodiment, movement detection module 204 may comprise trigger circuit 240 and motion sensor 238. Software controlling aspects of movement detection module 204 may be provided that operates on microprocessor 202.

One feature of GUI adjustment module 222F is to establish a baseline orientation for device 10. This baseline can be based on an absolute orientation (e.g. when device 10 is lying flat) or can be set to the current "resting" orientation of device 10 (e.g. the average orientation of device 10 for the past ten minutes). Once a baseline orientation is established, screen image 300 can be provided in a "straight on" view (for example screen image 300 in FIG. 3), where there a default position for the elements in screen image 300 (for example, the elements are centered in screen image 300 with no shifting of icons 304 and/or backgrounds 306).

The baseline position may be used when device 10 is at rest and subsequently redefined when device 10 is placed in a new resting position. For example, after setting a baseline, if device 10 is subsequently used while in a car or while the user is jogging, there may be a certain amount of ambient movement detected device 10. One mode of an embodiment can be to adjust the elements in the screen with the subsequent movement information. However, the elements shown in the screen may be moved to the default position, using the new resting position as the new baseline. The new resting position can be established through a routine that periodically reads signals detected by sensor 238. Thereafter, device 10 can determine an average "baseline" movement signal for when device 10 is at "rest" (i.e. a normalized net resting position for its current environment). As such, any movement signal is compared against the baseline movement signal to determine a "normalized" movement of device 10, as adjusted for its current environment. As movement module 204 recognizes movement(s) of device 10, such changes are used to map a movement of the notional viewing point of the user from the baseline position (e.g. at 402 in FIG. 4) to the new viewing point. Once the new viewing point is established, appropriate adjustments may be made to screen image 300. There may be a scaling factor provided to the detected movement in regards to the imparted movement mapped to the display generated on display 14.

The size of displacement provided to the icons 304 and/or background 306 and/or dialog boxes is typically in the order of numbers of pixels, for example between 1 to 10. Also, a "sandbox" may be imposed on the allowable ranges of shifting provided to elements in screen image 300. For example, a 3 pixel downward shift of elements in screen image 300 may be set as a maximum displacement, regardless of how much the top of device 10 is canted towards the user. The shifting of the icons/text and/or background may be implemented as a gradual shift through one or more intermediary positions or may be done implemented in one new screen showing the final position of the elements.

Figure 6:
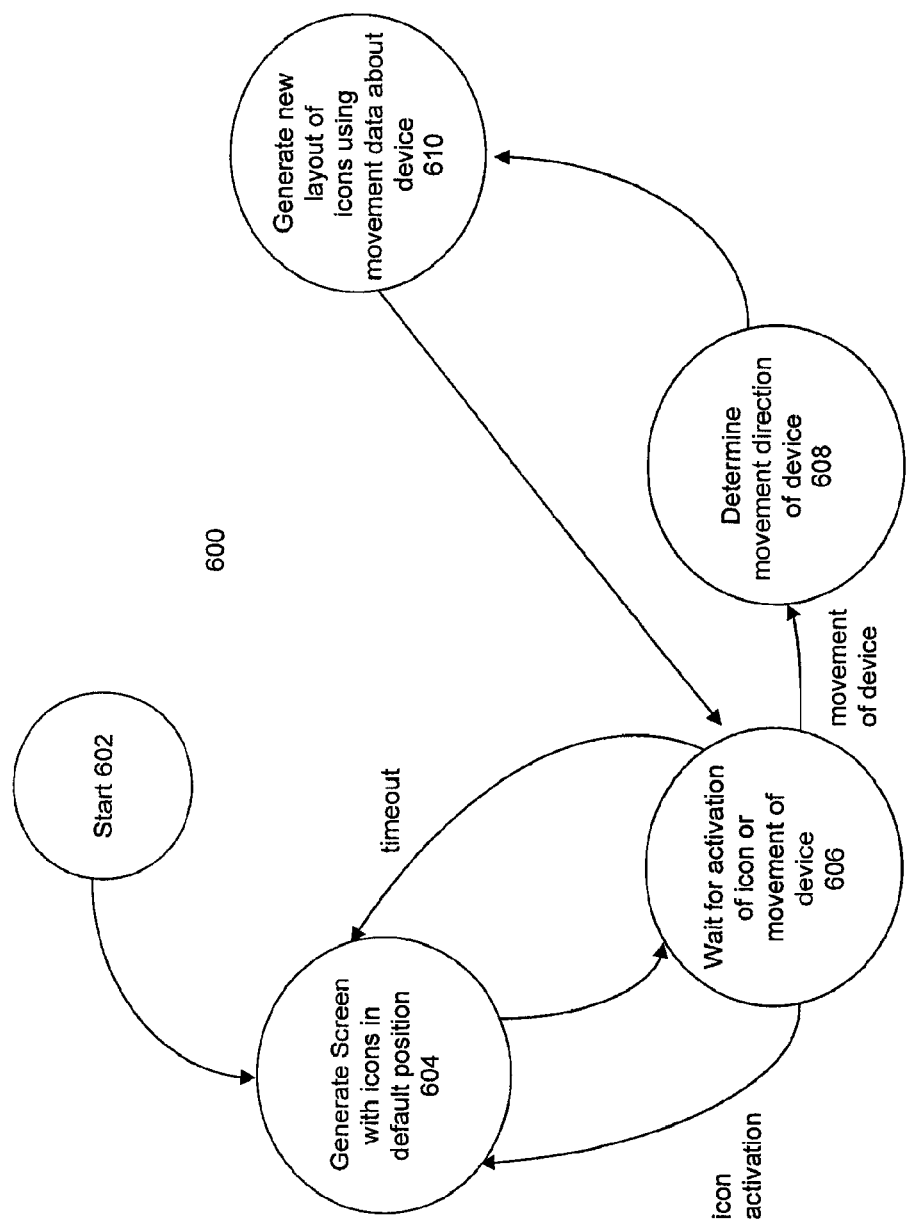
FIG. 6 is a state diagram of functions performed in processing orientation of icons displayed on an embodiment of FIGS. 1 and 2.

Referring to FIG. 6, state diagram 600 provides an exemplary progression of activities, shown as states, as GUI adjustment module 222F evaluates the current position of elements in a particular GUI and changes to the movement of device 10 to determine whether changes should be made to the position of the elements.

The process begins at step 602, where GUI adjustment module 222F is started. It may be a subroutine within an application or a separately operating application on device 10. Its initial function is to generate a screen with icons, text and background(s) in a default position, where there is preferably no shift of any of the elements at step 604. Data relating to the position of the elements in screen image 300 is stored in memory 216 or 218. Next, module 222F progresses to state 606, where it waits for either an activation of an icon or other activity necessitating a refreshing of the screen or a movement of device 10. If an icon has been activated, then module returns to state 604. If a movement has been detected, application moves to state 608 where the application determines the scope of the movement after analyzing the movement data from the sensors or circuit 204 and analyzing the data relating to the current position of the elements in screen image 300. Thereafter application moves to state 610, where a new screen is generated, where icons 304, text and/or background 306 and/or any dialog boxes are shifted from their original positions in screen image 300 to their new positions to account for the movement determined of device 10. As noted earlier, in one paradigm, elements that are in a base layer are not moved. Elements above and below the base layer can be repositioned to reflect the movement. The position information relating to these elements is also updated. Thereafter, module 222F return to state 606. It is notable that if a device remains unmoved for a set period of time, the GUI presentation can be reset to its default position, by module 222F as indicated by the timeout arrow connecting state 606 to state 604. When the moved elements are shifted back to their original positions, this can be done by redrawing the moved elements in one or more intermediary positions between their current position and their default position.

Another feature of an embodiment is the presentation of moving images, videos, animations, computer generated three dimensional objects and the like on a display of a device using a viewing location that takes into account the orientation of the device.

Moving images may be comprised of a series of related time-lapsed successive images. Alternatively, a three dimensional representation of objects may be implemented through computer-generated imagery (CGIs). In a CGI, objects such as sphere, cubes, geometric planes and other objects may be mathematically placed in a Cartesian space and then relative viewpoints may be dynamically changed as the "viewpoint" of the observer is changed within the space.

Figure 7:
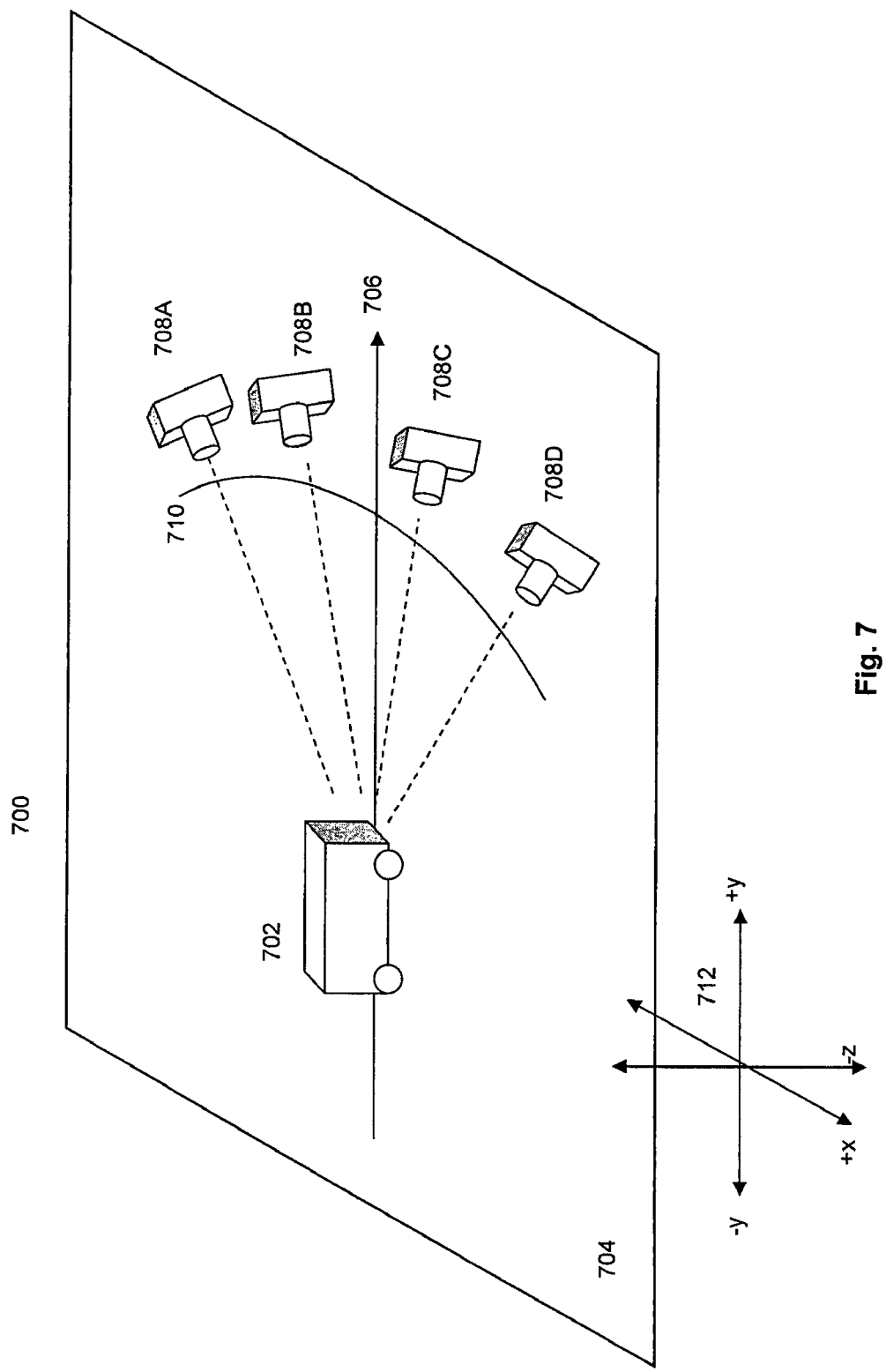
FIG. 7 is a perspective view of a moving vehicle that is captured as a series of moving images for use by a device of FIG. 1 incorporating another embodiment.

For example, referring to FIG. 7, scene 700 shows moving vehicle 702 moving along plane 704 in direction 706 towards a series of cameras 708A-D. Each camera 708 is positioned along arc 710 on plane 704 which intersects the forward direction 706 of vehicle 702. The height of each camera 708 is preferably at about the same height. However, additional views at different heights may be taken as well. As such, each camera captures a moving image of vehicle 702 from a different viewing location providing a slightly different angle and/or height. Each stream of images may be captured as digital data. Each frame of each stream may have timing data associated with it (whether provided by camera 708 or timestamped by device 10 or another device) to allow synchronization of image streams among camera 708. Each of the stream of images may be stored locally on device 10, if sufficient storage resources are available, or remotely to device 10 in a separate video server that is in communication with device 10 and can transmit a selected video stream to device 10 with sufficient bandwidth to maintain a sufficient frame rate for displaying moving images on device 10. Additionally, a CGI version of vehicle 702 may be digitally captured. Orientation rose 712 provides a Cartesian reference for the x, y and z directions.

Figure 8A:
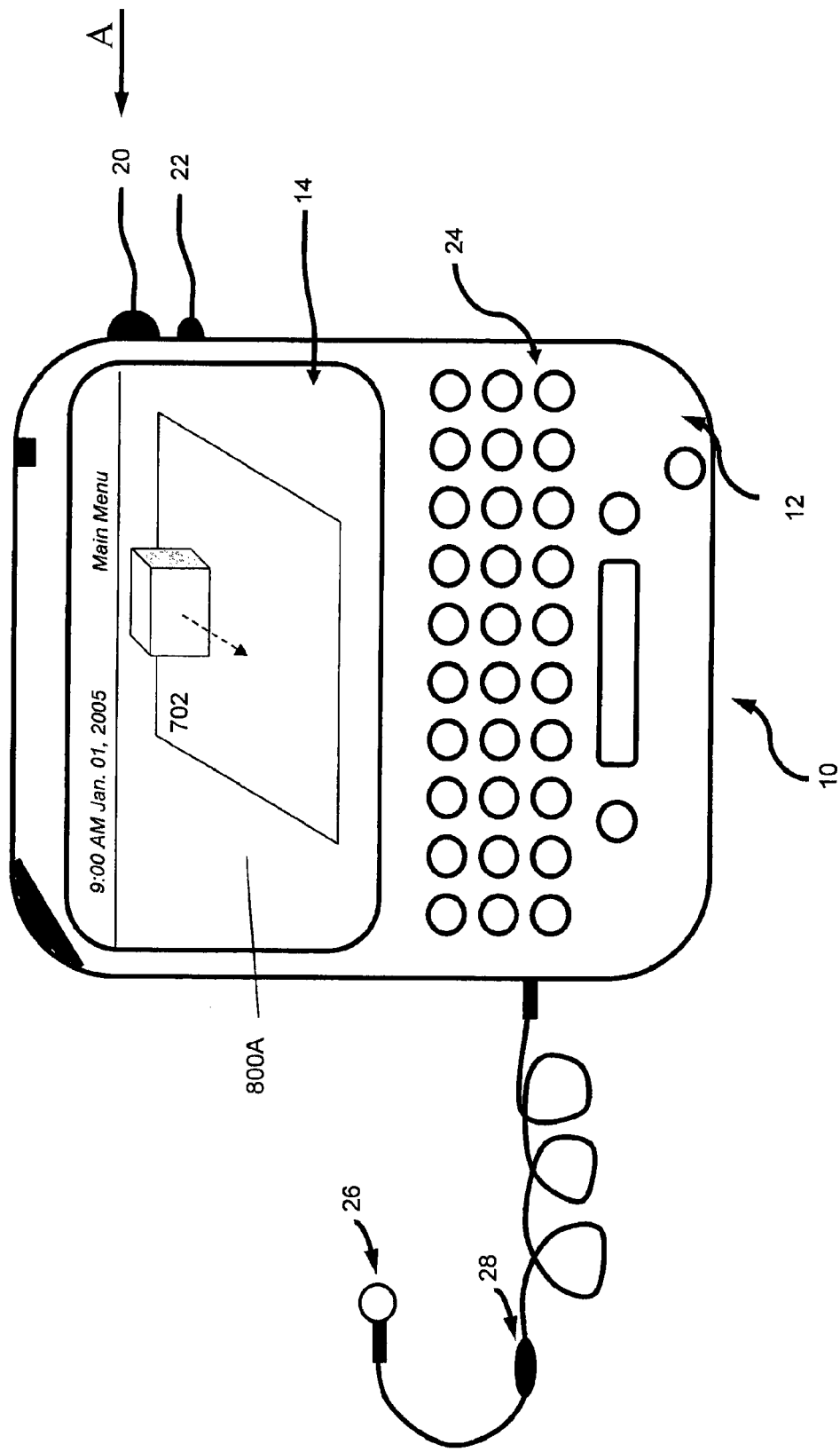
FIG. 8A is a schematic representation of the device of FIG. 1 showing on its display a moving image from FIG. 7 from a default viewing location produced at the start of execution of the moving image adjustment system of an embodiment.
Figure 8B:
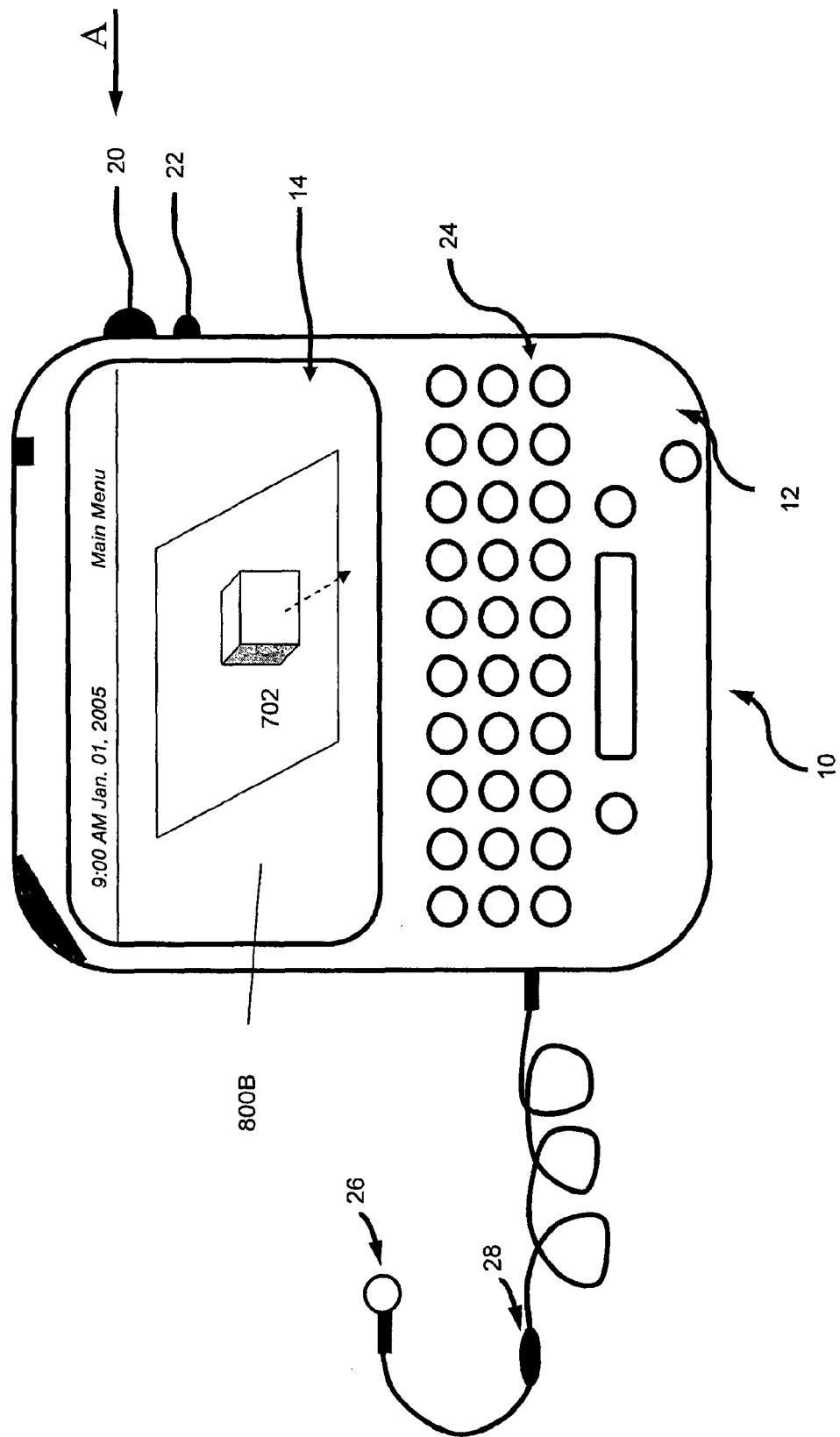
FIG. 8B is a schematic representation of the device of FIG. 1 showing on its display a moving image from FIG. 7 from a new viewing location during execution of the moving image adjustment system of an embodiment.
Figure 9:
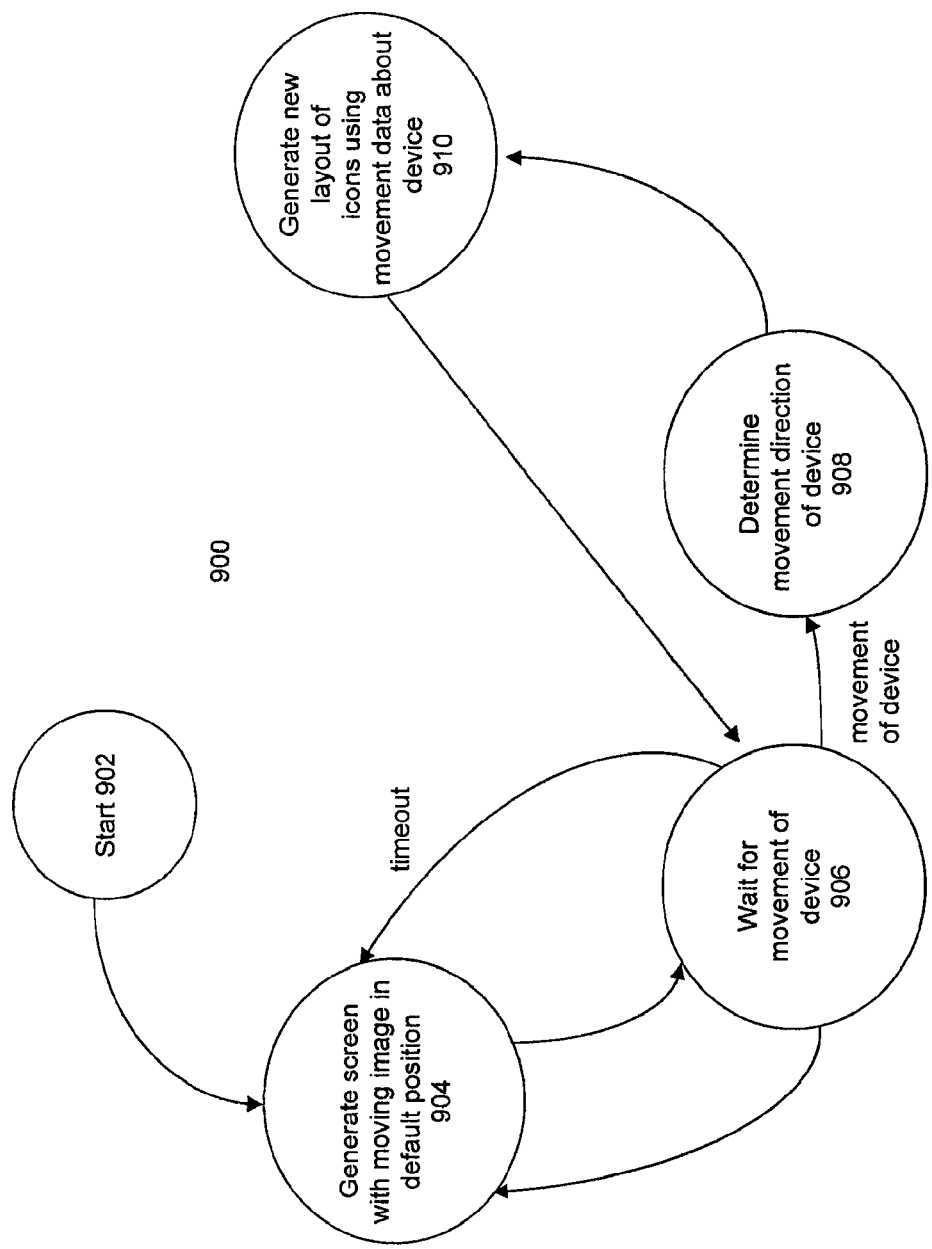
FIG. 9 is a state diagram of functions performed in processing moving images of FIG. 7 by the device of FIG. 1.

Referring to FIGS. 8A, 8B and 9, further detail is provided on moving image processing module 222G. Additionally or alternatively, processing of features of the moving image may be conducted by a remote computational device that transmits either new coordinate data or an image itself to device 10 for generation on display 14. State diagram 900 provides an exemplary progression of activities, shown as states, as moving image adjustment module 222G evaluates the current viewing position of a moving image and changes the viewing position according to the movement of device 10.

The process begins at step 902, where moving image adjustment module 222G is started. It may be a subroutine within an application or a separately operating application on device 10. After starting, module 222G moves to state 904 to generate a moving image on screen 14 of device 10. For example, referring to FIG. 8A, in device 10, its display 14 shows moving image 800A of scene 700 where vehicle 702 is seen from camera 708B (which has been set as the default viewing location). Data relating to the current viewing position of the moving image is stored in memory 216 or 218. It is presumed that device 10 is situated at a steady state orientation or position. For example, device 10 may be lying flat on a table or may be held steadily by a user at a fairly static position. In the steady state position, the paradigm places the default line of sight for a video image to be notional from camera 706B (other cameras may be used instead).

Next, module 222G progresses to state 906, where it waits for a movement of device 10. The wait may be conducted on an interrupt basis, as the moving image is still being updated on the display. If a movement has been detected, application moves to state 908 where the application determines the scope of the movement after analyzing the movement data from the sensors or circuit 204.

Thereafter application moves to state 910, where a new moving image is generated, where preferably the moving image begins from the point in time that the original moving image was at when device 10 was moved, but with the moving image being shown from the new point of view, as determined by module 222G. When device 10 is moved, the selected video image is chosen to reflect or mimic the point of view of the new orientation of device 10 from its previous orientation. As such, if device 10 is rotated such that the right side of device 10 is pitched downward, then this has the perceived effect of panning the video image to one of the camera views to the left of camera 708B, such as 708C or 708D. The selection of which view to use (708C or 708D) will depend on the amount that device 10 is rotated. Referring to FIG. 8B, upon mapping a degree of movement of device 10 to a suitable camera view 708, the moving image is changed to pick up on the newly selected camera view 708 (such as 708C or 708D). In transitioning from the current view to the newly selected view, at the transition point, the last frame of the current view is generated on device 10, then the next expected frame 800B in the time line is selected from the video stream from the newly selected view. As such, vehicle 702 is further along the y-axis in image 800B compared to 800A. As such, a transition is made between views that attempts to maintain time coherency between the current and the newly selected views.

Thereafter, module 222G returns to state 906. The new viewing location is maintained for the time being. However, if a device remains unmoved for a set period of time, the point of view of the moving image may be reset to its default position, by module 222G as indicated by the timeout arrow connecting state 906 to state 904 (returning perhaps to a view location as provided by FIG. 8A). When the point of view of the moving image is shifted back to its original position, this can be done by changing the point of view to one or more intermediary positions between the current position and the default position.

In order to provide a default viewing arrangement for screen, after the viewing location of the moving image is shifted and after a preset amount of time has passed, the viewing location of the moving image may be realigned to its original default position, providing a quasi-"gravity" effect for the elements. The return shift may be gradual, wherein the video image is transitioned to intermediate views 706 as the video image "creeps" back to a view at its default position. Additionally or alternatively, the viewing location may slowly drift to a center location, where the viewing location for the animation or video is moved back to its original/centre/neutral position at a slow rate. Preferably, the rate is sufficiently slow such that the user would not notice the shifting, thereby allowing device 10 to accept a new movement which would then be processed to shift the image in another direction.

In order to create and select an appropriate video stream, there may need to be a large amount of computational resources available to produce and select a moving image for an embodiment. As such, if such resources may be provided remotely and then the resulting output only may be sent to device 10.

There are several image processing techniques that may be used to generate the views provided herein. It will be appreciated that techniques known in the art may to store, capture, generate and process a series of different perspective views of a moving image may be used.

For example, additionally or alternatively, a three-dimensional moving image may be created by combining two moving images of the same scene of objects where the perspective of each viewing point of each moving image is slightly offset from each other (such as from cameras 706B and 706C). The two video streams provide stereoscopic data that may be combined, manipulated and/or interpolated to create a new perspective scene from the original moving images. The new scene may be geometrically panned, tilted, rotated and moved such that its viewing location for the new scene may be adjusted to coincide with for the moving image for the (virtual) video stream that is required movement data provided by device 10. Techniques for combining two video streams (comprising a series of individual frames) into a new scene and changing a viewing location for the new scene are known to those of skill in the art of graphics processing.

Additionally or alternatively, one or more objects of the image may be represented in a virtual three dimensional space and then when a new viewing position is determined by the movement of device 10, image processing software (either on device 10 or software operating remotely from device 10) calculates a new viewing location for the image and the image is redrawn through known computer graphics image processing techniques.

The video image may occupy the full frame of screen. Alternatively, the video image may be generated in a thumbnail window in screen. Also, a moving image may be provided as part of a "wallpaper" of part of a scene generated on screen. In such a context, movement of device 10 would change the viewing angle of the scene generated on the wallpaper, as described above. In addition, background (static) elements may be imposed on plane 704. These background elements may be shifted as described in relation to FIGS. 5A-5C in addition to the moving image being provided with its new viewing location. Also, additional shifting processes for one or more static elements as described in relation to GUI adjustment module 222F may be provided in conjunction with a change of viewing location of moving image by module 222G.

Figure 10:
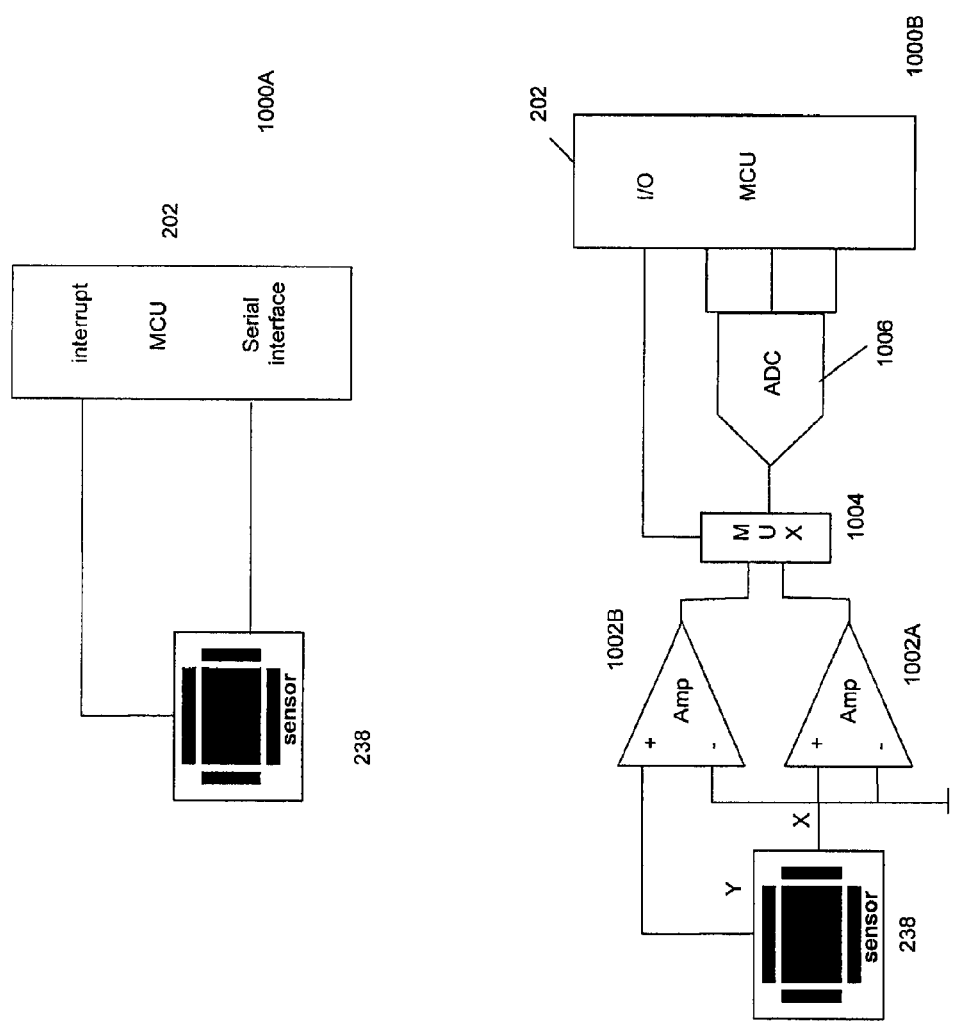
FIG. 10 is a block diagram of two separate movement detection systems of the embodiment of FIG. 1.

Referring to FIG. 10, further detail is provided on the movement detection module 204 and its related components. Therein, two sensors arrangements for device 10 are shown. Circuit 1000A shows sensor 238 directly connected to the interrupt and serial interface input lines of microprocessor 202. Accordingly, software operating on microprocessor 202 is provided to selectively monitor signal(s) from sensor 238 to determine whether a notable movement of device 10 has been detected. The circuit between sensor 238 and microprocessor 202 can be considered to be one version of circuit 240. Software operating on microprocessor 202 determines when a notable signal has been generated by sensor 238. Circuit 1000B shows sensor 238 connected to trigger circuit 240A having two differential comparators 1002A and 1002B, which then have their outputs attached to an analog mux 704. The mux selectively provides its output according to a control signal generated by microprocessor 202. The analog output of mux 1004 is converted to a set of digital signals by analog to digital converter 1006, which then provides the output to microprocessor 202. As with other implementation, software operating on microprocessor 202 determines when a notable signal has been generated by sensor 238. Reading of positions determined by the software can be stored in memory 218 or 216. The software can also create an average reading of the movement readings. This average reading can be used to determine when device 10 is in a resting position or when it is effectively in a resting position (e.g. it is being moved only in inconsequential amounts).

For any embodiment, a low-g MEMs (micro-electromechanical system) accelerometer may be used for motion sensor 238. Further, the accelerometer may be of almost any type, including a capacitive, piezoelectric, piezoresistive, or a gas-based accelerometer. An exemplary low-g MEM accelerometer is a LIS3L02AQ tri-axis analog accelerometer, available from STMicroelectronics of Geneva, Switzerland. Accelerometers sense and convert an acceleration detected from a motion (e.g. tilt, inertial, or vibration) or gravity into an electrical signal (producing a corresponding change in output) and are available in one, two or three axis configurations. Accelerometers may produce digital or analog output signals.

To improve sensitivities of an accelerometer when it is used as motion sensor 238, its outputs can be calibrated to compensate for individual axis offset and sensitivity variations. Calibrations can also be performed at the system level, providing end-to-end calibration. Calibrations can also be performed by collecting a large set of measurements with the device in different orientations.

Figure 11:
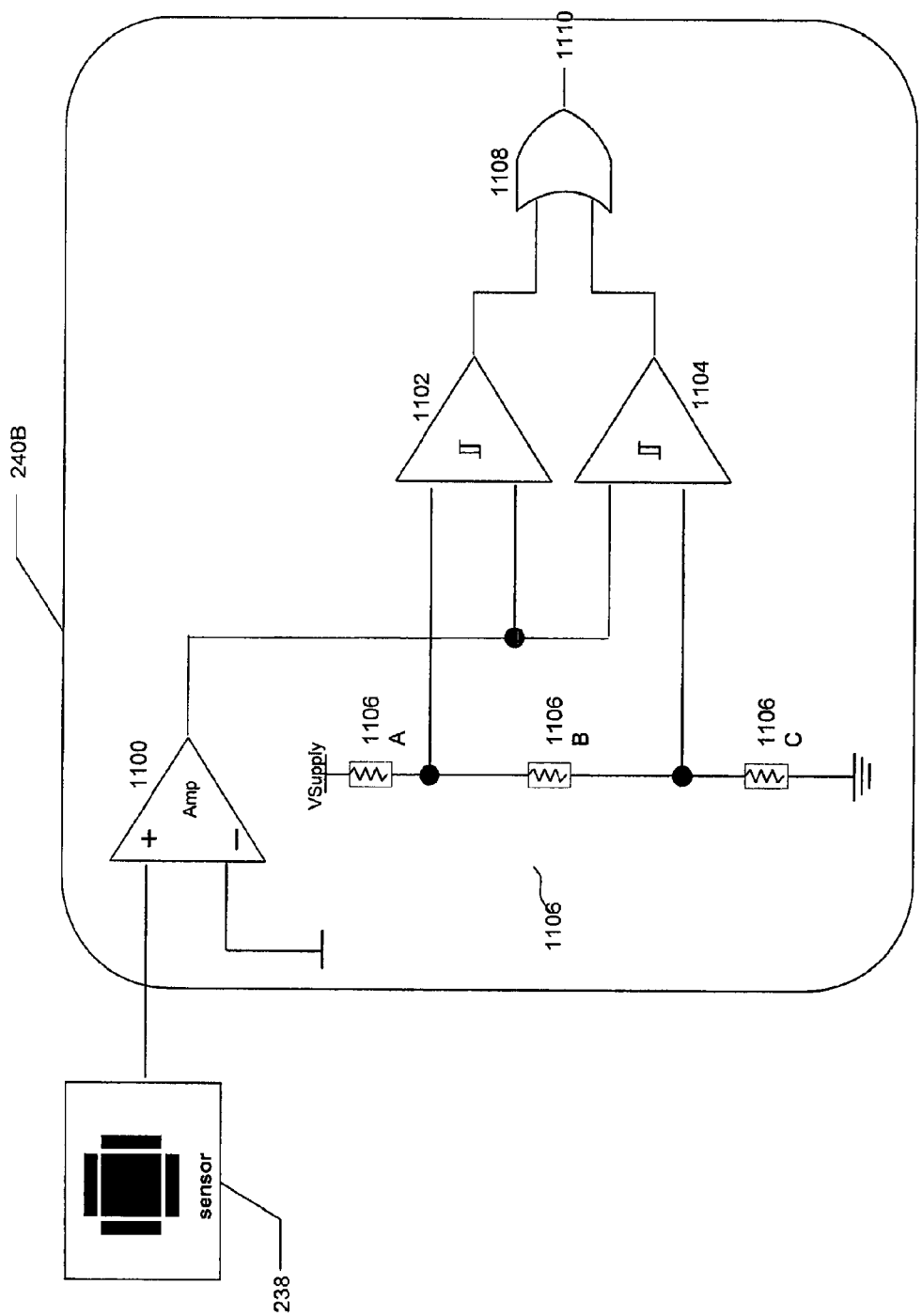
FIG. 11 is a block diagram of an alternative movement detection system the embodiment of FIG. 1.

Referring to FIG. 11, an alternative circuit 240B is shown for sensor 238 which is aligned as a single axis analog sensor. Sensor 238 can be oriented such that its output detects movement along a desired axis (e.g. 'Z' axis detecting when device moved vertically). Additional axes may be monitored by replicating circuit 240B for each additional axis. Briefly, the output of sensor 238 is provided to buffer amp 1100. The output of buffer amp 1100 is provided in tandem to comparators 1102 and 1104. The other inputs of comparators 1102 and 1104 are taken from different taps on resistor ladder 1106, comprising resistors 1106A, 1106B and 1106C. Comparators 1102 and 1104 each produce upper and lower limit comparison signals for the output of sensor 238. If the value of the signal from sensor 238 is either above the upper limit set by the parameters of comparator 1102 (comparing the signal from sensor 238 against its tap from the resistor ladder 1106) or below the lower limit set by the parameters of comparator 1104 (comparing the signal from sensor 238 against its tap from the resistor ladder 1106) then OR gate 1108 generates a trigger signal 1110. It will be appreciated that the limits can be used to define a range of signals detected by sensor 238 representing when be device 10 is either stationary (e.g. at rest) or being moved.

It will be appreciated that other circuits using different combinations of sensors and triggering components and threshold detectors may be used to provide functionalities of sensor 238 and circuit 240.

In other embodiments, motion sensor 238 may be substituted or combined with a different device, such as a spring-loaded switch, a tilt switch, a gyroscope, a mercury switch, a GPS locator or any other device which can generate a signal responsive to movement or change in orientation of device 10. It is preferable that the device have low quiescent power draw characteristics.

It will be appreciated that modules 222F and 222G and other applications in the embodiments can be implemented using known programming techniques, languages and algorithms. The titles of the modules are provided as a convenience to provide labels and assign functions to certain modules. It is not required that each module perform only its functions as described above. As such, specific functionalities for each application may be moved between applications or separated into different applications. Modules may be contained within other modules. Different signalling techniques may be used to communicate information between applications using known programming techniques. Known data storage, access and update algorithms allow data to be shared between applications. It will further be appreciated that other applications and systems on device 10 may be executing concurrently with any application 222. As such, one or more aspects of modules 222F and 222G may be structured to operate in as a "background" application on device 10, using programming techniques known in the art.

The present invention is defined by the claims appended hereto, with the foregoing description being merely illustrative of a preferred embodiment of the invention. Those of ordinary skill may envisage certain modifications to the foregoing embodiments which, although not explicitly discussed herein, do not depart from the scope of the invention, as defined by the appended claims.

The invention claimed is:

1. A moving image management system for a moving image displayed in a screen on a display of an electronic device, comprising:
   a sensor for sensing at least changes in orientation of the electronic device;
   a microprocessor connected to said sensor and configured to receive data related to the electronic device;
   a moving image processing module, executed by the microprocessor, configured to receive a plurality of video streams each representing a different viewing location for a moving image, including at least a first video stream, and to cause display of the first video stream as the moving image;
   a movement detection module, executed by the microprocessor, providing movement data registering a notable orientation change signal from said sensor; and
   a moving image adjustment module, executed by the microprocessor, determining a new viewing location of said moving image utilizing said movement data and generating a replacement moving image using stereoscopic data relating to said plurality of video streams and said movement data based on the new viewing location determination,
   wherein said moving image adjustment module further shifts a static background image associated with said moving image in said screen reflecting said new viewing location.

2. The moving image management system as claimed in claim 1, wherein said replacement moving image is generated only if said movement data is within a predetermined shift range.

3. The moving image management system as claimed in claim 2, wherein said sensor provides positional pitch data about a new movement.

4. The moving image management system as claimed in claim 3, wherein said sensor further provides positional yaw data about said new movement.

5. The moving image management system as claimed in claim 1, wherein said moving adjustment module reverts said replacement moving image to a default viewing location associated with said first video stream after a predetermined amount of time has passed with no notable further orientation change of said device.

6. The moving image management system as claimed in claim 1, wherein said plurality of video streams utilize computer generated imagery.

7. The moving image management system as claimed in claim 6, wherein:
   said sensor is an accelerometer.

8. A method for adjusting a presentation of a moving image in a screen on a display of an electronic device, comprising:
   sensing at least changes in orientation of the electronic device;
   receiving a plurality of video streams each representing a different viewing location for a moving image, including at least a first video stream;
   displaying the first video stream as the moving image;
   monitoring for a notable orientation change of said electronic device based on said sensing;
   when said notable orientation change has been detected, determining, using a microprocessor of said electronic device, a new viewing location for said moving image utilizing orientation data relating to said notable orientation change and generating a replacement moving image using stereoscopic data relating to said plurality of video streams and said orientation data based on the new viewing location determination; and
   shifting a static background image associated with said moving image in response to said orientation data.

9. The method for adjusting presentation of elements displayed in a screen as claimed in claim 8, further comprising reverting said new viewing location to a default viewing location associated with said first video stream when a predetermined amount of time has passed with no notable further orientation change of said electronic device being detected.

10. The method for adjusting presentation of elements displayed in a screen as claimed in claim 8, wherein said plurality of video streams utilize computer generated imagery.

11. A portable electronic device, comprising:
   a sensor for sensing at least changes in orientation of the electronic device;
   a display;
   a moving image processing module configured to receive a plurality of video streams each representing a different viewing location for a moving image, including at least a first video stream;

software generating a moving image on said display based on said first video stream;
a movement detection module connected to said sensor providing orientation data registering a notable orientation change signal from said sensor;
an image adjustment module determining a new viewing location of said image utilizing said orientation data and generating a replacement moving image using stereoscopic data relating to said plurality of video streams and said orientation data based on the new viewing location determination,
wherein said image adjustment module shifts a static background element associated with said image in said screen by a predetermined number of pixels in response to said orientation data.

12. The portable electronic device as claimed in claim 11, wherein said sensor is an accelerometer detecting a change in pitch in orientation of said device.

* * * * *

UNITED STATES PATENT AND TRADEMARK OFFICE
CERTIFICATE OF CORRECTION

| | | |
|---|---|---|
| PATENT NO. | : 8,493,323 B2 | |
| APPLICATION NO. | : 11/832074 | |
| DATED | : July 23, 2013 | |
| INVENTOR(S) | : Griffin | |

It is certified that error appears in the above-identified patent and that said Letters Patent is hereby corrected as shown below:

In the Specification

Column 1, line 8, "2006 now" should read --2006, now--.

Column 1, line 36, "do not accommodate" should read --does not accommodate--.

Column 2, line 25, "system the embodiment" should read --system of the embodiment--.

Column 3, line 12, "determining replacement" should read --determining a replacement--.

Column 3, line 47, "adjusting the a viewing position" should read --adjusting a viewing position--.

Column 3, line 57, "'details of aspect" should read --details of aspects--.

Column 4, lines 4-5, "desktop computers pagers or laptops" should read --desktop computers, pagers, or laptops--.

Column 4, line 53, "determine the whether device 10" should read --determine whether device 10--.

Column 5, lines 50-51, "includes processing module," should read --includes processing modules,--.

Column 5, line 56, "Mobitex®, DataTAC®" should read --Mobitex (trade-mark), DataTAC (trade-mark)--.

Signed and Sealed this
Eleventh Day of February, 2014

Michelle K. Lee
*Deputy Director of the United States Patent and Trademark Office*

CERTIFICATE OF CORRECTION (continued)
U.S. Pat. No. 8,493,323 B2

Column 5, line 61, "Code Division Multiple Access CDMA," should read
--Code Division Multiple Access (CDMA),--.

Column 7, line 7, "window provide" should read --window to provide--.

Column 7, line 33, "allow user" should read --allow the user--.

Column 7, line 40, "daily/weekly/month" should read --daily/weekly/monthly--.

Column 8, line 20, "show notional" should read --show the notional--.

Column 9, line 26, "icons 306" should read --icons 304--.

Column 9, line 27, "an view" should read --a view--.

Column 9, line 32, "icons 306," should read --icons 304,--.

Column 9, line 33, "icons 306" should read --icons 304--.

Column 10, line 20, "where there a default" should read
--where there is a default--.

Column 10, line 29, "detected device 10." should read --detected by device 10.--.

Column 10, line 60, "may be done implemented" should read
--may be implemented--.

Column 11, lines 11-12, "then module returns" should read
--then the module returns--.

Column 11, lines 12-13, "detected, application" should read
--detected, the application--.

Column 11, lines 26-27, "module 222F return" should read
--module 222F returns--.

Column 11, lines 43-44, "objects such as sphere," should read
--objects such as spheres,--.

Column 12, line 29, "camera 706B" should read --camera 708B--.

Column 13, lines 7-8, "arrangement for screen," should read
--arrangement for the screen,--.

CERTIFICATE OF CORRECTION (continued)
U.S. Pat. No. 8,493,323 B2

Column 13, line 26, "As such, if such resources" should read
--As such, such resources--.

Column 13, line 31, "known in the art may to store," should read
--known in the art to store,--.

Column 13, line 38, "cameras 706B and 706C)." should read
--cameras 708B and 708C).--.

Column 13, line 44, "coincide with for the moving image" should read
--coincide with the moving image--.

Column 14, line 8, "two sensors arrangements" should read
--two sensor arrangements--.

Column 14, line 20, "mux 704." should read --mux 1004.--.

Column 14, line 25, "As with other implementation," should read
--As with other implementations,--.

Column 15, line 8, "when be device 10" should read --when device 10--.

Column 15, line 38, "operate in as" should read --operate as--.